United States Patent
Van Os et al.

(10) Patent No.: US 11,693,937 B2
(45) Date of Patent: *Jul. 4, 2023

(54) AUTOMATIC RETRIES FOR FACIAL RECOGNITION

(71) Applicant: Apple Inc., Cupertino, CA (US)

(72) Inventors: Marcel Van Os, Santa Cruz, CA (US); Thorsten Gernoth, San Francisco, CA (US); Kelsey Y. Ho, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,979

(22) Filed: Apr. 26, 2019

(65) Prior Publication Data

US 2019/0370449 A1    Dec. 5, 2019

Related U.S. Application Data

(63) Continuation of application No. 16/141,084, filed on Sep. 25, 2018, now Pat. No. 10,303,866.

(Continued)

(51) Int. Cl.
*G06F 21/32* (2013.01)
*G06V 40/16* (2022.01)

(52) U.S. Cl.
CPC ............ *G06F 21/32* (2013.01); *G06V 40/166* (2022.01); *G06V 40/171* (2022.01); *G06V 40/172* (2022.01)

(58) Field of Classification Search
None
See application file for complete search history.

(56) References Cited

U.S. PATENT DOCUMENTS

| 7,734,067 B2 | 6/2010 | Kim et al. |
| 8,150,142 B2 | 4/2012 | Freedman et al. |

(Continued)

FOREIGN PATENT DOCUMENTS

| CN | 104106080 A | 10/2014 |
| CN | 104408343 A | 3/2015 |

(Continued)

OTHER PUBLICATIONS

U.S. Appl. No. 15/881,261, filed Jan. 26, 2018, all pages.

(Continued)

*Primary Examiner* — Fatoumata Traore
(74) *Attorney, Agent, or Firm* — Kowert, Hood, Munyon, Rankin & Goetzel, P.C.; Gareth M. Sampson

(57) ABSTRACT

An operation of a facial recognition authentication process may fail to authenticate a user even if the user is an authorized user of the device. In such cases, the facial recognition authentication process may automatically re-initiate to provide another attempt to authenticate the user using additional captured images. For the new attempt (e.g., the retry) to authenticate the user, one or more criteria for the images used in the facial recognition authentication process may be adjusted. For example, criteria for distance between the camera and the user's face and/or occlusion of the user's face in the images may be adjusted before the new attempt to authenticate the user. Adjustment of these criteria may increase the likelihood that the authorized user will be successfully authenticated in the new attempt.

17 Claims, 5 Drawing Sheets

Related U.S. Application Data

(60) Provisional application No. 62/679,847, filed on Jun. 3, 2018.

(56) References Cited

U.S. PATENT DOCUMENTS

| | | | |
|---|---|---|---|
| 8,254,647 B1* | 8/2012 | Nechyba | G06V 40/165 |
| | | | 382/118 |
| 8,364,971 B2* | 1/2013 | Bell | G06F 21/34 |
| | | | 713/186 |
| 8,384,997 B2 | 2/2013 | Shpunt et al. | |
| 8,396,265 B1 | 3/2013 | Ross | |
| 8,411,909 B1* | 4/2013 | Zhao | G06K 9/00899 |
| | | | 382/116 |
| 8,457,367 B1* | 6/2013 | Sipe | G06F 21/32 |
| | | | 382/118 |
| 8,749,796 B2 | 6/2014 | Pesach et al. | |
| 8,913,839 B2 | 12/2014 | Ricanek, Jr. et al. | |
| 9,230,152 B2 | 1/2016 | Boshra | |
| 9,292,728 B2 | 5/2016 | Boshra et al. | |
| 9,412,169 B2* | 8/2016 | Bud | H04N 5/23206 |
| 9,576,126 B2 | 2/2017 | Boshra et al. | |
| 9,721,150 B2 | 8/2017 | Gottemukkula et al. | |
| 9,836,643 B2 | 12/2017 | Saripalle et al. | |
| 2007/0189583 A1* | 8/2007 | Shimada | G06K 9/00255 |
| | | | 382/118 |
| 2007/0211925 A1* | 9/2007 | Aoki | G06K 9/00255 |
| | | | 382/118 |
| 2009/0060293 A1* | 3/2009 | Nagao | G06K 9/00221 |
| | | | 382/118 |
| 2009/0258667 A1* | 10/2009 | Suzuki | G06F 21/32 |
| | | | 340/5.53 |
| 2011/0185402 A1* | 7/2011 | Wang | H04L 9/0866 |
| | | | 726/5 |
| 2012/0235790 A1* | 9/2012 | Zhao | H04W 12/065 |
| | | | 340/5.83 |
| 2013/0015946 A1* | 1/2013 | Lau | G06F 21/32 |
| | | | 340/5.2 |
| 2013/0247175 A1 | 9/2013 | Nechyba et al. | |
| 2013/0251215 A1* | 9/2013 | Coons | H04N 5/23219 |
| | | | 382/118 |
| 2014/0016837 A1* | 1/2014 | Nechyba | G06V 40/161 |
| | | | 382/118 |
| 2015/0092996 A1 | 4/2015 | Tian | |
| 2015/0013949 A1 | 5/2015 | Murakami et al. | |
| 2016/0086013 A1 | 3/2016 | Boshra | |
| 2016/0110588 A1* | 4/2016 | Ikenoue | G06V 10/98 |
| | | | 382/118 |
| 2016/0125223 A1 | 5/2016 | Boshra et al. | |
| 2016/0178915 A1 | 6/2016 | Mor et al. | |
| 2016/0203306 A1 | 7/2016 | Boshra | |
| 2017/0053109 A1* | 2/2017 | Han | G06F 21/32 |
| 2017/0344807 A1 | 11/2017 | Jillela et al. | |
| 2018/0196475 A1* | 7/2018 | Bao | H04M 1/0264 |

FOREIGN PATENT DOCUMENTS

| | | |
|---|---|---|
| CN | 106022034 A | 10/2016 |
| KR | 10-2007-0081773 A | 8/2007 |
| KR | 10-2014-0125078 A | 10/2014 |

OTHER PUBLICATIONS

U.S. Appl. No. 16/141,084, filed Sep. 25, 2018, all pages.
ISRWO, PCT/US2019/033362, mailed Jul. 30, 2019, 17 pages.
IPRP, PCT/US2019/033362, mailed Dec. 17, 2020, 13 pages.
European Patent Application No. 19729145.3, EPO Communication, Examination Report, dated May 31, 2022, 5 pages.
Office Action in Korean Patent Application No. 10-2020-7033784 dated Sep. 20, 2022, 9 pages.
Office Action in Chinese Chinese Appl. No. 201910443198.3 dated Oct. 26, 2022, 18 pages.

* cited by examiner

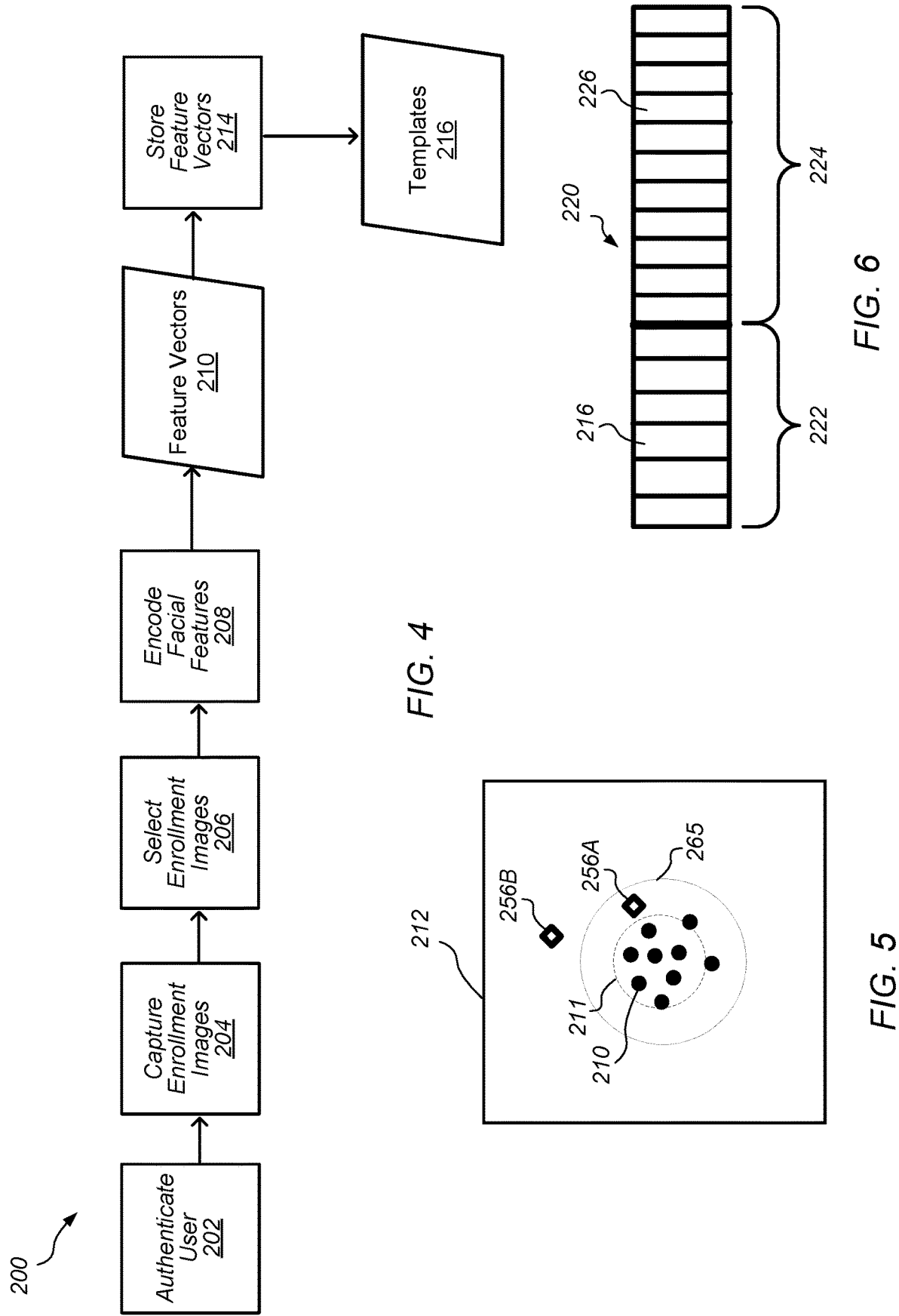

AUTOMATIC RETRIES FOR FACIAL RECOGNITION

PRIORITY CLAIM

This patent is a continuation of U.S. patent application Ser. No. 16/141,084 to Van Os et al., entitled "AUTOMATIC RETRIES FOR FACIAL RECOGNITION", filed Sep. 25, 2018, which claims priority to U.S. Provisional Patent Application No. 62/679,847 to Van Os et al., entitled "AUTOMATIC RETRIES FOR FACIAL RECOGNITION", filed Jun. 3, 2018, each of which are incorporated by reference in their entirety.

BACKGROUND

1. Technical Field

Embodiments described herein relate to methods and systems for face detection and recognition in images captured by a camera on a device. More particularly, embodiments described herein relate to retrying of a facial recognition authentication process after the facial recognition authentication process fails at an attempt to authenticate a user.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

For authentication using facial recognition, the facial recognition system may sometimes encounter problems in authenticating an authorized user when images captured during the authentication process are captured under non-ideal conditions. For example, the user's face being too far/too close to the camera, the user's face having some occlusion in the captured image, and/or the user's attention or pose in the images being less than ideal may prevent matching (e.g., authentication) of the authorized user in the captured images with the authorized user enrolled on the device. If the user repeatedly fails to be authorized using the facial recognition authentication process, the user may become frustrated with the experience and look for other avenues of authentication and/or search for another device to use instead of the current device.

SUMMARY

In certain embodiments, in the event a facial recognition authentication process fails to authenticate a user, the facial recognition authentication process may re-initiate and retry to authenticate the user using newly captured images. The re-initiation of the facial recognition authentication process may be automatic without input from the user (e.g., the user does not have to provide additional input to re-initiate the process). Automatic re-initiation of the facial recognition authentication process may provide a more satisfying user experience (if the re-attempted process is successful in authenticating the user).

In some embodiments, one or more criteria for the images are adjusted when the facial recognition authentication process is re-initiated. The criteria for the images may include criteria that are useful in determining that the images can be successfully operated on to authenticate the user. Examples of criteria for the images include distance between the camera and the user's face, attention of the user in the images, pose of the user's face in the images (e.g., pitch, yaw, and roll of the face), and/or occlusion of the user's face in the images. Adjusting one or more of the criteria before re-initiating the facial recognition authentication process may improve the chances of success in the subsequent facial recognition authentication process.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which:

FIG. 4 depicts a flowchart of an embodiment of an image enrollment process for an authorized user of a device.

FIG. 5 depicts a representation of an embodiment of a feature space with feature vectors after an enrollment process.

FIG. 6 depicts a representation of an embodiment of a template space for an enrollment profile in a memory of a device.

Figure 1:
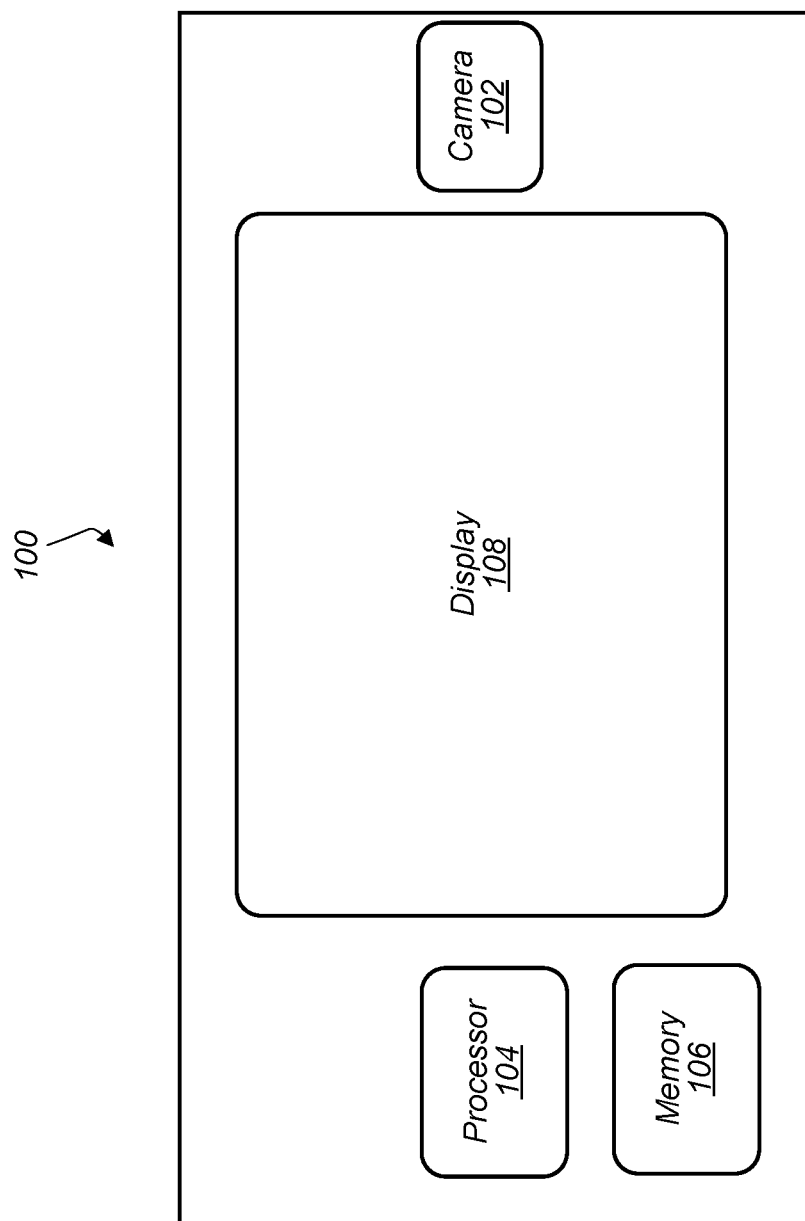
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

As described herein, one aspect of the present technology is the gathering and use of data available from various sources to improve the operation and access to devices. The present disclosure contemplates that in some instances, this gathered data may include personal information data that uniquely identifies or can be used to contact or locate a specific person. Such personal information data can include image data (e.g., data from images of the user), demographic data, location-based data, telephone numbers, email addresses, home addresses, or any other identifying information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity, as such uses pertain only to operation of the devices, and not shared or sold outside of those legitimate uses. Further, such collection should occur only after receiving the informed consent of the user and the personal information data should remain secured on the device on which the personal information is collected. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
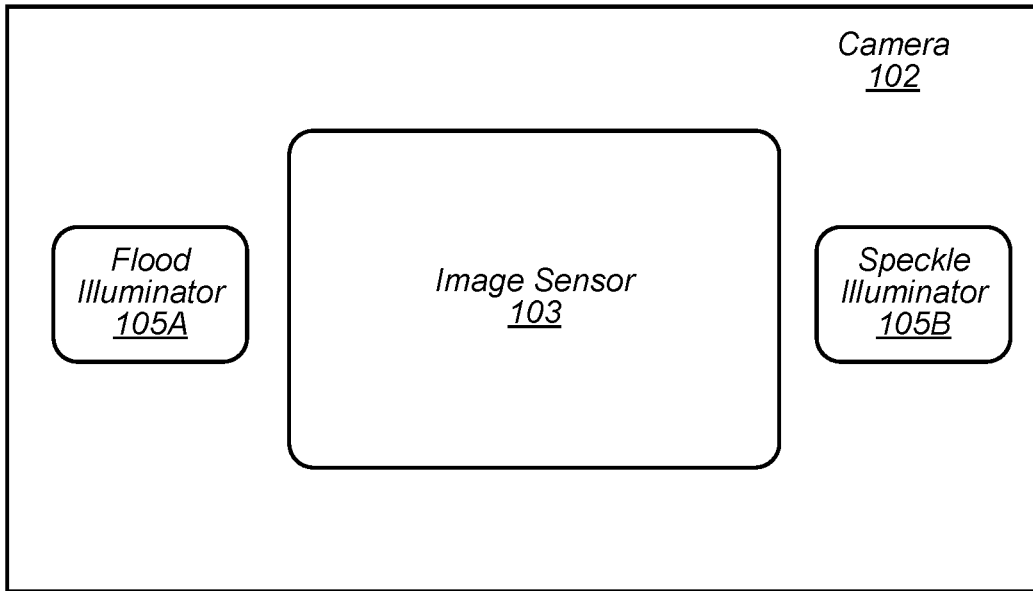
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator"), illuminators for RGB light, and/or illuminators for infrared light (e.g., a flood IR source and a pattern (speckle pattern) projector). In some embodiments, the flood IR source and pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light.

For depth detection or generating a depth map image, illuminator 105B may provide IR illumination with a pattern (e.g., patterned infrared (IR) illumination). The pattern may be a pattern of light with a known, and controllable, configuration and pattern projected onto a subject (e.g., a structured pattern of light). In certain embodiments, the pattern is a speckle pattern (e.g., a pattern of dots). The pattern may, however, include any structured or semi-structured pattern of light features. For example, the pattern may include, but not be limited to, dots, speckles, stripes, dashes, nodes, edges, and combinations thereof.

Illuminator 105B may include a VCSEL array configured to form the pattern or a light source and patterned transparency configured to form the pattern. The configuration and pattern of the pattern provided by illuminator 105B may be selected, for example, based on a desired pattern density (e.g., speckle or dot density) at the subject. Image sensor 103 may capture images of the subject illuminated by the pattern. The captured image of the pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
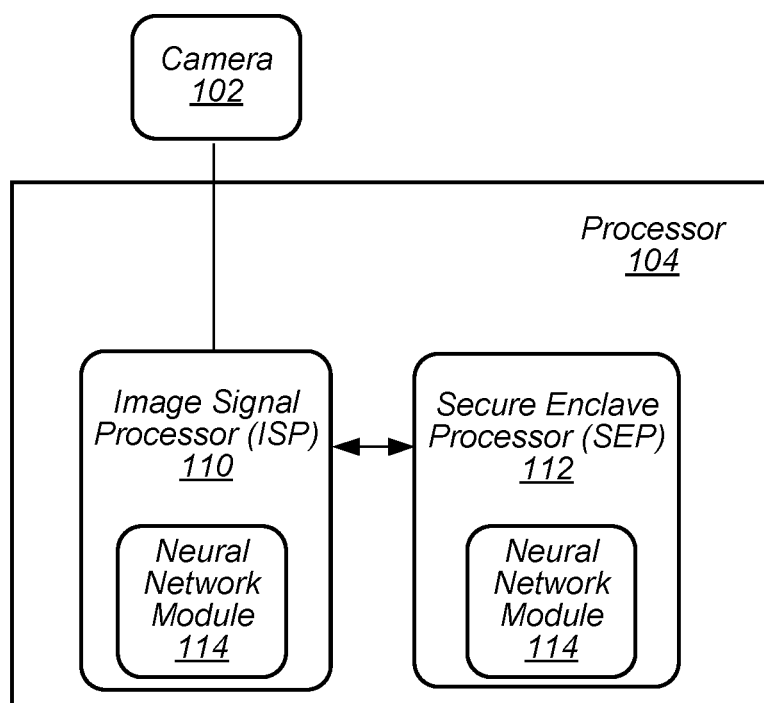
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., image enrollment process 200, as shown in FIG. 4, or a registration process) to capture images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process (e.g., first template update process 300 and/or second template update process 400 described herein) may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a patterned illumination image used to generate a depth map image). In certain embodiments, ISP 110 and/or SEP 112 process the flood IR images and patterned illumination images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and patterned illumination images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and patterned illumination image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

FIG. 4 depicts a flowchart of an embodiment of image enrollment process 200 for an authorized user of device 100. Process 200 may be used to create an enrollment profile for an authorized user of device 100 that is stored in the device (e.g., in a memory coupled to SEP 112). The enrollment profile may include one or more templates for the authorized user created using process 200. The enrollment profile and the templates associated with the enrollment profile may be used in a facial recognition process to allow (e.g., authorize) the user to use the device and/or perform operations on the device (e.g., unlock the device).

In certain embodiments, process 200 is used when device 100 is used a first time by the authorized user and/or when the user opts to create an enrollment profile for a facial recognition process. For example, process 200 may be initiated when device 100 is first obtained by the authorized user (e.g., purchased by the authorized user) and turned on for the first time by the authorized user. In some embodiments, process 200 may be initiated by the authorized user when the user desires to enroll in a facial recognition process, update security settings for device 100, re-enroll, and/or add an enrollment profile on the device.

In certain embodiments, process 200 begins with authenticating the user in 202. In 202, the user may be authenticated on device 100 using a non-facial authentication process. For example, the user may be authenticated as an authorized user by entering a passcode, entering a password, or using another user authentication protocol other than facial recognition. After the user is authenticated in 202, one or more enrollment (e.g., reference or registration) images of the user are captured in 204. The enrollment images may include images of the user illuminated by flood illuminator 105A (e.g., flood IR images) and/or images of the user illuminated by illuminator 105B (e.g., patterned illumination images). As described herein, flood IR images and patterned illumination images may be used independently and/or in combination in facial recognition processes on device 100 (e.g. the images may independently be used to provide an authentication decision and the decisions may be combined to determine a final decision on user authentication).

The enrollment images may be captured using camera 102 as the user interacts with device 100. For example, the enrollment images may be captured as the user follows prompts on display 108 of device 100. The prompts may include instructions for the user to make different motions and/or poses while the enrollment images are being captured. During 204, camera 102 may capture multiple images for each motion and/or pose performed by the user. Capturing images for different motions and/or different poses of the user where the images still have a relatively clear depiction of the user may be useful in providing a better variety of enrollment images that enable the user to be authenticated without having to be in a limited or restricted position relative to camera 102 on device 100.

After the multiple enrollment images are captured in 204, selection of enrollment images for further image processing may be made in 206. Selection of enrollment images 206, and further processing of the images, may be performed by ISP 110 and/or SEP 112. Selection of enrollment images for further processing may include selecting images that are suitable for generating templates. For example, the selection of images that are suitable for use generating templates in 206 may include assessing one or more selected criteria for the images and selecting images that meet the selected criteria. The selected images may be used to generate templates for the user. Selected criteria may include, but not be limited to, the face of the user being in the field of view of the camera, a pose of the user's face being proper (e.g., the user's face is not turned too far in any direction from the camera (i.e., the pitch, yaw, and/or roll of the face are not above certain levels)), a distance between camera 102 and the face of the user being in a selected distance range, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, if more than one face is detected in an enrollment image, the enrollment image is rejected and not used (e.g., not selected) for further processing. Selection of images suitable for further processing may be rule based on the images meeting a certain number of the selected criteria or all of the selected criteria. In some embodiments, occlusion maps and/or landmark feature maps are used in identifying features of the user (e.g., facial features such as eyes, nose, and mouth) in the images and assessing the selected criteria in the images.

After images are selected in 206, features of the user in the selected (template) images may be encoded in 208. Encoding of the selected images may include encoding features (e.g., facial features) of the user to define the features in the images as one or more feature vectors in a feature space. Feature vectors 210 may be the output of the encoding in 208. A feature space may be an n-dimensional feature space. A feature vector may be an n-dimensional vector of numerical values that define features from the image in the feature space (e.g., the feature vector may be a vector of numerical values that define facial features of the user in the image).

FIG. 5 depicts a representation of an embodiment of feature space 212 with feature vectors 210. Each feature vector 210 (black dot) may define facial features for the user from either a single image, from a composite image (e.g., an image that is a composite of several images), or from multiple images. As feature vectors 210 are generated from a single user's facial features, the feature vectors may be similar to one another because the feature vectors are associated with the same person and may have some "clustering", as shown by circle 211 in FIG. 5. Feature vectors 256A and 256B (open diamonds) are feature vectors obtained from facial recognition process 250, described below.

As shown in FIG. 4, process 200 may include, in 214, storing feature vectors 210 in a memory of device 100 (e.g., a memory protected by SEP 112). In certain embodiments, feature vectors 210 are stored as static templates 216 (e.g., enrollment templates or reference templates) in a template space of the memory (e.g., template space 220 described below). Static templates 216 may be used for the enrollment profile created by process 200. In some embodiments, static templates 216 (and other templates described herein) include separate templates for feature vectors obtained from the enrollment flood IR images and for feature vectors obtained from the enrollment patterned illumination images. It is to be understood that the separate templates obtained from flood IR images and patterned illumination images (e.g., images used to generate depth map images) may be used independently and/or in combination during additional processes described herein. For simplicity in this disclosure, static templates 216 are described generically and it should be understood that static templates 216 (and the use of the templates) may refer to either templates obtained from flood IR images or templates obtained from patterned illumination images. In some embodiments, a combination of the flood IR images and patterned illumination images may be used to generate templates. For example, pairs of feature vectors obtained from flood IR images and patterned illumination images may be stored in static templates 216 to be used in one or more facial recognition processes on device 100.

FIG. 6 depicts a representation of an embodiment of template space 220 for an enrollment profile in memory 106 of device 100. In certain embodiments, template space 220 is located in a portion of memory 106 of device 100 protected by SEP 112. In some embodiments, template space 220 includes static portion 222 and dynamic portion 224. Static templates 216 may be, for example, added to static portion 222 of template space 220 (e.g., the templates are permanently added to the memory and are not deleted or changed unless the device is reset). In some embodiments, static portion 222 includes a certain number of static templates 216. For example, for the embodiment of template space 220 depicted in FIG. 6, six static templates 216 are allowed in static portion 222. In some embodiments, nine static templates 216 may be allowed in static portion 222. Other numbers of static templates 216 in static portion 222 may also be contemplated. After the enrollment process for the enrollment profile is completed and static templates 216 are added to static portion 222, additional dynamic templates 226 may be added to dynamic portion 224 of template space 220 for the enrollment profile (e.g., a portion from which templates may be added and deleted without a device reset being needed).

Static templates 216 may thus be enrollment templates (or reference templates) generated by enrollment process 200 for the enrollment profile associated with the enrollment process. After enrollment process 200 is completed, a selected number of static templates 216 are stored in static portion 222 of template space 220 for the enrollment profile. The number of static templates 216 stored in static portion 222 after enrollment process 200 may vary depending on, for example, the number of different feature vectors obtained during the enrollment process, which may be based on the number of images selected to be suitable for use as template images, or a desired number of templates for the device. After enrollment process 200, static templates 216 include feature vectors 210 (e.g., the enrollment or reference feature vectors) that can be used for facial recognition of the authorized user associated with the enrollment profile. Thus, template space 220 may be used in a facial recognition authentication process to authorize the user associated with the enrollment profile.

Figure 7:
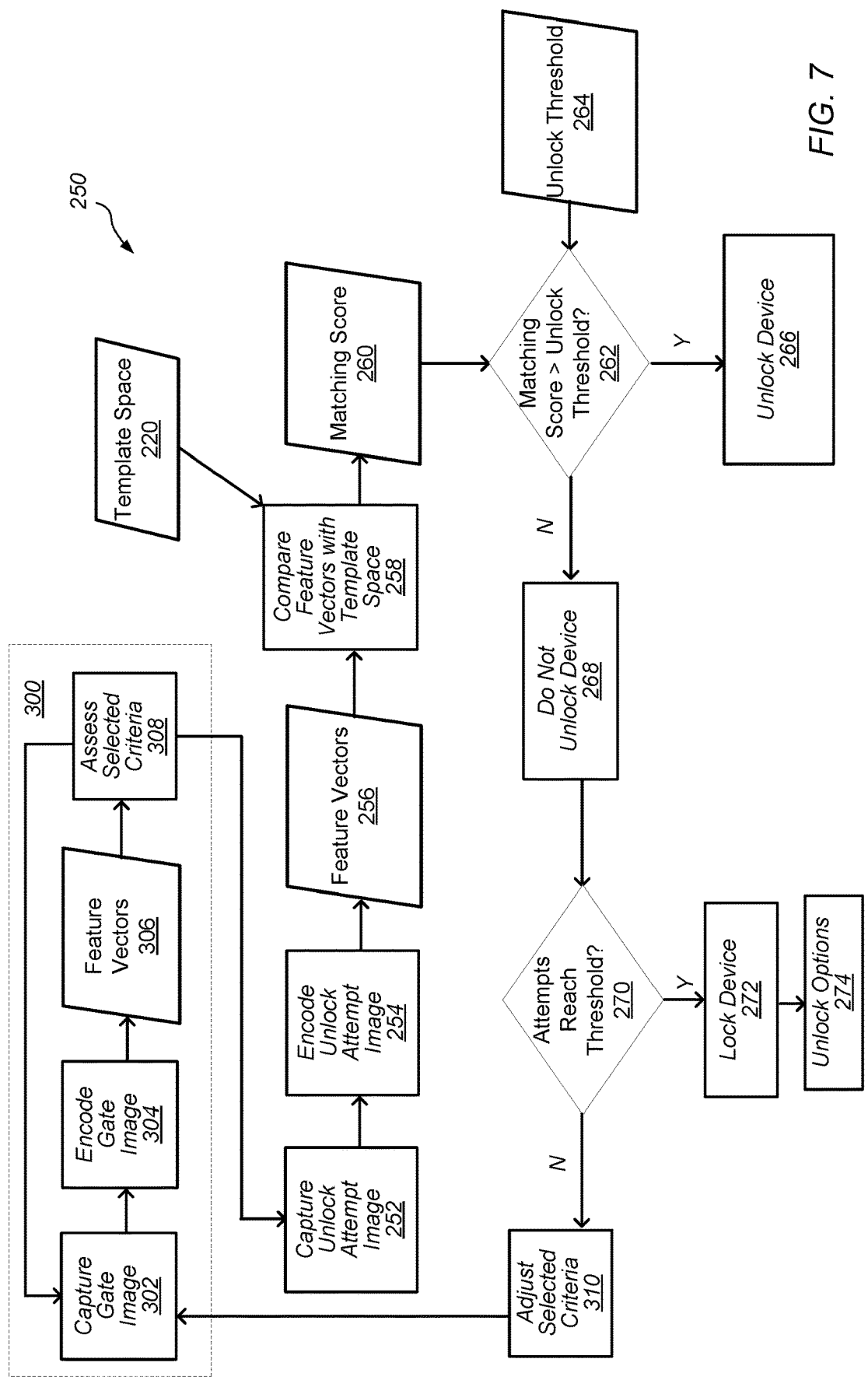
FIG. 7 depicts a flowchart of an embodiment of a facial recognition authentication process.

FIG. 7 depicts a flowchart of an embodiment of facial recognition authentication process 250. Process 250 may be used to authenticate a user as an authorized user of device 100 using facial recognition of the user. In certain embodiments, process 250 is used to authenticate a user using an enrollment profile (e.g., template space 220) on device 100. Authentication of the authorized user may allow the user to access and use device 100 (e.g., unlock the device) and/or have access to a selected functionality of the device (e.g., unlocking a function of an application running on the device, payment systems (i.e., making a payment), access to personal data, expanded view of notifications, etc.). In certain embodiments, process 250 is used as a primary biometric authentication process for device 100 (after enrollment of the authorized user). In some embodiments, process 250 is used as an authentication process in addition to another authentication process (e.g., fingerprint authentication, another biometric authentication, passcode entry, password entry, and/or pattern entry). In some embodiments, another authentication process (e.g., passcode entry, pattern entry, other biometric authentication) may be used to access device 100 if the user fails to be authenticated using process 250.

In certain embodiments, process 250 begins with sub-process 300. Sub-process 300 may be an initial process (e.g., a "gate process") to assess an initial image captured by device 100 to determine if process 250 should continue with further downstream processing to authenticate the user. Sub-process 300 may begin with capturing an image of the user attempting to be authenticated for access to device 100 in 302 (e.g., the camera captures a "gate" image of the user). In certain embodiments, in 302, camera 102 captures a flood IR image of the user for the gate image. It is to be understood that the gate image may be a single image of the face of the user (e.g., a single flood IR image) or the gate image may be a series of several images of the face of the user taken over a short period of time (e.g., one second or less). In some embodiments, the gate image may include a combination of flood IR images and patterned illumination images (e.g., pairs of consecutive flood IR and patterned illumination images). In some embodiments, the gate image may be a composite of several images of the user illuminated by the flood illuminator and/or the pattern illuminator.

Camera 102 may capture the gate image in response to a prompt by the user. For example, the gate image may be captured when the user attempts to access device 100 by pressing a button (e.g., a home button or virtual button) on device 100, by moving the device into a selected position relative to the user's face (e.g., the user moves the device such that the camera is pointed at the user's face or lifting the device from a table), and/or by making a specific gesture or movement with respect to the device (e.g., (e.g., tapping on the screen, swiping the user's finger across the display, or picking the device off the table).

In 304, the gate image may be encoded to define the facial features of the user as one or more feature vectors in the feature space. In some embodiments, one feature vector is defined for the gate image. In some embodiments, multiple feature vectors are defined for the gate image. Gate feature vector(s) 306 may be the output of the encoding of the gate image in 304.

In certain embodiments, feature vectors 306 are assessed in 308 to determine if selected criteria (e.g., "gate criteria") are met in the images before the feature vectors are further processed to unlock device 100 (e.g., before any attempt to match the feature vectors with templates). Selected criteria that are assessed from feature vectors 306 may include, but not be limited to, a minimum portion of the face of the user being in the field of view of the camera, a pose of the user's face being proper (e.g., the user's face is not turned too far in any direction from the camera (i.e., the pitch, yaw, and/or roll of the face are not above certain levels)), a distance between camera 102 and the face of the user being within a selected distance range, the face of the user having occlusion below a minimum value (e.g., the user's face is not occluded (blocked) more than a minimum amount by another object), the user paying attention to the camera (e.g., eyes of the user looking at the camera), eyes of the user not being closed, proper lighting (illumination or exposure) in the image, and/or the camera being blocked or occluded (e.g., by a finger over the camera). The types and number of selected criteria to be met before further processing may be determined based on desired settings for process 250 and sub-process 300. For example, in some embodiments, the selected criteria to be met may be chosen to provide qualities in the images that are most likely to provide more accuracy in downstream processing of the feature vectors (e.g., downstream processing of the images).

If, at any time during operation of sub-process 300, all of the selected criteria are met in 308, then process 250 continues with capturing unlock attempt image(s) in 252. In some embodiments, process 250 may continue in 252 if not all of the selected criteria are met in 308. For example, process 250 may be allowed to continue if 3 out of 4 selected criteria are met and/or if certain combinations of selected criteria are met.

In certain embodiments, if any of the selected criteria are not met in 308, then no further downstream processing in process 250 may occur (e.g., no unlock attempt images are captured in 252). In some embodiments, if a rejection of further processing based on the selected criteria occurs in 308, then a new gate image is captured in 302 and sub-process 300 processes the new image to see if the new image meets the selected criteria. In some embodiments, sub-process 300 may be repeated until the selected criteria are met by an image captured in 302. In some embodiments, if sub-process 300 continues to reject gate images based on the selected criteria, the sub-process (and process 250) are stopped and device 100 is locked from further attempts to unlock the device. For example, sub-process 300 may be repeated until a maximum number of gate images are processed and/or a maximum time limit on attempting to meet the selected criteria with a gate image is reached. In some embodiments, sub-process 300 may continue to be repeated until the display on device 100 turns off (e.g., the sub-process is repeatedly tried as long as the display is on).

In some embodiments, after device 100 is locked by sub-process 300, an error message may be displayed (e.g., on display 108) indicating that facial recognition authentication process 250 has failed and/or the desired operation of device 100 is restricted or prevented from being performed. Device 100 may be locked from further attempts to use facial authentication for a specified period of time and/or until another authentication protocol is used to unlock the device. For example, a passcode, a password, pattern entry, a different form of biometric authentication, or another authentication protocol may be used to unlock device 100.

In some embodiments, sub-process 300 operates without feedback to the user (e.g., output or notification to the user) about rejection of images and repeated attempts to capture an image that meets the selected criteria. In some embodiments, the user is provided feedback when a gate image is rejected. For example, an audio message, a visual message, or another notification may be provided if device 100 is too close to the user's face (e.g., the distance between camera 102 and the user's face is shorter than the selected distance range), is too far from the user's face (e.g., the distance between the camera and the user's face exceeds the selected distance range) and/or the user's face is occluded in the view of the camera.

As described above, process 250 continues in 252 from sub-process 300 if all (or a selected number) of the selected criteria are met in 308. In 252, camera 102 captures an additional image of the face of the user to attempt to authenticate the user to access device 100 (e.g., the camera captures an "unlock attempt" image of the user). It is to be understood that the unlock attempt image may be a single image of the face of the user (e.g., a single flood IR image or single patterned illumination image) or the unlock attempt image may be a series of several images of the face of the user taken over a short period of time (e.g., one second or less). In some embodiments, the series of several images of the face of the user includes pairs of flood IR images and patterned illumination images (e.g., pairs of consecutive flood IR and patterned illumination images). In some implementations, the unlock attempt image may be a composite of several images of the user illuminated by the flood illuminator and the pattern illuminator.

It is to be further understood that, as described herein, unlock attempt images may include either flood IR images or patterned illumination images (e.g., images used to generate depth map images), or a combination thereof. Further, the unlock attempt images may be processed in association with their corresponding template (e.g., flood IR images with a template for flood IR enrollment images) independently or in combination as needed.

In 254, the unlock attempt image is encoded to define the facial features of the user as one or more feature vectors in the feature space. In some embodiments, one feature vector is defined for the unlock attempt image. In some embodiments, multiple feature vectors are defined for the unlock attempt image. Unlock feature vector(s) 256 may be the output of the encoding of the unlock attempt image in 254.

In certain embodiments, in 258, feature vector(s) 256 are compared to feature vectors in the templates of template space 220 to get matching score 260 for the unlock attempt image. In certain embodiments, template space 220 is the template space for an enrollment profile on device 100. Matching score 260 may be a score of the differences between feature vector(s) 256 and feature vectors in template space 220 (e.g., feature vectors in static templates 216 and/or other dynamic templates 226 added to the template space as described herein). The closer (e.g., the less distance or less differences) that feature vector(s) 256 and the feature vectors in template space 220 are, the higher matching score 260 may be. For example, as shown in FIG. 5, feature vector 256A (open diamond) is closer to feature vectors 210 than feature vector 256B (open diamond)(e.g., feature vector 256B is a further outlier than feature vector 256A). Thus, feature vector 256A would have a higher matching score than feature vector 256B. As feature vector 256B is further away from feature vectors 210 than feature vector 256A, the lower matching score for feature vector 256B means less confidence that the face in the unlock attempt image associated with feature vector 256B is the face of the authorized user associated with the enrollment profile and template space 220.

In some embodiments, comparing feature vector(s) 256 and templates from template space 220 to get matching score 260 includes using one or more classifiers or a classification-enabled network to classify and evaluate the differences between feature vector(s) 256 and templates from template space 220. Examples of different classifiers that may be used include, but are not limited to, linear, piecewise linear, nonlinear classifiers, support vector machines, and neural network classifiers. In some embodiments, matching score 260 is assessed using distance scores between feature vector(s) 256 and templates from template space 220.

In 262, matching score 260 is compared to unlock threshold 264 for device 100. Unlock threshold 264 may represent a minimum difference (e.g., distance in the feature space) in features (as defined by feature vectors) between the face of the authorized user and the face of the user in the unlock attempt image that device 100 requires in order to unlock the device (or unlock a feature on the device). For example, unlock threshold 264 may be a threshold value that determines whether the unlock feature vectors (e.g., feature vectors 256) are similar enough (e.g., close enough) to the templates associated with the authorized user's face (e.g., static templates 216 in template space 220). As further example, unlock threshold 264 may be represented by circle 265 in feature space 212, depicted in FIG. 5. As shown in FIG. 5, feature vector 256A is inside circle 265 and thus feature vector 256A would have matching score 260 above unlock threshold 264. Feature vector 256B, however, is outside circle 265 and thus feature vector 256B would have matching score 260 below unlock threshold 264. In certain embodiments, unlock threshold 264 is set during manufacturing and/or by the firmware of device 100. In some embodiments, unlock threshold 264 is updated (e.g., adjusted) by device 100 during operation of the device as described herein.

As shown in FIG. 7, in 262, if matching score 260 is above unlock threshold 264 (i.e., the user's face in the unlock attempt image substantially matches the face of the authorized user), the user in the unlock attempt image is authenticated as the authorized user for the enrollment profile on device 100 and the device is unlocked in 266. In 262, if matching score 260 is below unlock threshold 264 (e.g., not equal to or above the unlock threshold), then device 100 is not unlocked in 268 (e.g., the device remains locked). It should be noted that device 100 may be either locked or unlocked if matching score 260 is equal to unlock threshold 264 depending on a desired setting for the unlock threshold (e.g., tighter or looser restrictions). Additionally, either option for an equal matching score comparison may be also applied as desired for other embodiments described herein.

In certain embodiments, the unlock attempts are compared to a threshold in 270. The threshold may be, for example, a maximum number of unlock attempts allowed or a maximum allotted time for unlock attempts. In certain embodiments, a number of unlock attempts is counted (e.g., the number of attempts to unlock device 100 with a different unlock attempt image captured in 252) and compared to the maximum number of unlock attempts allowed.

In certain embodiments, if the unlock attempts reaches the threshold (e.g., number of unlock attempts reaches the maximum number of attempts allowed), then device 100 is locked from further attempts to use facial authentication in 272. In some embodiments, when the device is locked in 272, an error message may be displayed (e.g., on display 108) indicating that facial recognition authentication process 250 has failed and/or the desired operation of device 100 is restricted or prevented from being performed. Device 100 may be locked from further attempts to use facial authentication in 272 for a specified period of time and/or until another authentication protocol is used to unlock the device. For example, unlock options 274 may be used to unlock device 100.

Unlock options 274 may include the user being presented with one or more options for proceeding with a different type of authentication to unlock or access features on device 100 (e.g., the user is presented options for proceeding with a second authentication protocol). Presenting the options may include, for example, displaying one or more options on display 108 of device 100 and prompting the user through audible and/or visual communication to select one of the displayed options to proceed with unlocking the device or accessing features on the device. The user may then proceed with unlocking/accessing device 100 using the selected option and following additional audible and/or visual prompts as needed. After successfully being authenticated using the selected option, the user's initial request for unlocking/accessing device 100 may be granted. Unlock options 274 may include, but not be limited to, using a passcode, a password, pattern entry, a different form of biometric authentication, or another authentication protocol to unlock device 100. In some embodiments, unlock options 274 includes providing a "use passcode/password/pattern" affordance that, when selected causes display of a passcode/password/pattern entry user interface, or a passcode/password/pattern entry user interface, or a "use fingerprint" prompt that, when displayed, prompts the user to place a finger on a fingerprint sensor for the device.

If the unlock attempts are below the threshold in 270 (e.g., number of unlock attempts are below the maximum number of attempts allowed), then process 250 may be run again (re-initiated) beginning with another gate image in sub-process 300 (e.g., sub-process 300 is re-initiated and a new image of the user is captured (such as a new flood IR image) in 302). In some implementations, device 100 automatically captures the new gate image of the user's face without prompting the user (e.g., capturing of the new image is automatically implemented and/or hidden from the user). In some implementations, device 100 notifies the user (either visually and/or audibly) that process 250 is being re-initiated. In some embodiments, device 100 may prompt the user to provide input to re-initiate process 250. For example, the user may be prompted to acknowledge or otherwise confirm (either visually and/or audibly) the attempt to re-initiate process 250.

In certain embodiments, as shown in FIG. 7, one or more of the selected criteria (assessed in 308) are adjusted in 310 before sub-process 300 is re-initiated. Adjusting the selected criteria in 310 may include providing tighter (e.g., more restrictive) tolerances on one or more selected criteria. In some embodiments, adjusting the selected criteria in 310 includes adjusting a selected number of the selected criteria (e.g., only a subset of the selected criteria are adjusted). The selected criteria chosen to be adjusted in 310 may include selected criteria that, when adjusted, are likely to provide more accuracy in the matching process for unlock attempt images in process 250. For example, adjusting of these selected criteria may increase the likelihood of unlock attempt images captured in 252 being used to accurately authorize the user in the re-initiation of process 250 (if the user attempting to unlock device 100 is the authorized user and not an unauthorized user).

In some embodiments, one of the selected criteria adjusted in 310 includes the selected distance range for the distance between camera 102 and the user's face. In certain embodiments, the selected distance range is reduced to a smaller range. For example, the selected distance range may be reduced by about 5 cm, by about 10 cm, or by about 15 cm on one or both ends of the range. Thus, gate images captured in successive re-initiation attempts of sub-process 300 may have a reduced selected distance range for the face of the user to meet when feature vectors 306 are assessed in 308. Reducing the selected distance range for the selected criteria of distance between camera 102 and the user's face may increase the likelihood that the user's face is in at an optimum distance from the camera and more accurate feature vectors (e.g., feature vectors likely to match the feature vectors in template 220) are extracted (e.g., encoded) from images captured in 252.

In some embodiments, data for estimated distance between camera 102 and the user's face obtained from unlock attempt images captured in 252 are used in adjusting the selected distance range in 310. Estimated data for distance between camera 102 and the user's face may, for example, be obtained from patterned illumination images (e.g., images used to generate depth map images) captured as unlock attempt images (e.g., feature vectors 256 include distance data). Depth map images generated from patterned illumination images may be more accurate in estimating distance as the depth map images include three-dimensional data. Thus, using distance data from the depth map images may be useful in providing the adjustment needed for the selected distance range in 310. For example, the distance data from the depth map images may be used to assess if the user's face was too near the lower limit or the upper limit of the selected distance range in the previous unlock attempt images. The depth map image distance data may then be used to adjust raise the lower limit and/or lower the upper limit to increase the likelihood of a better match in the re-initiation of process 250.

In some embodiments, one of the selected criteria adjusted in 310 the minimum value of occlusion in the gate image(s) captured in 302. For example, the minimum value of occlusion may be reduced (e.g., less occlusion may be allowed in newly captured gate images). In some embodiments, the minimum value of occlusion may be reduced to essentially zero (no occlusion allowed) for the selected criteria. Reducing the minimum value of occlusion may increase the number of features in the user's face that are captured in the unlock attempt images and the number of corresponding feature vectors extracted. The increased number of feature vectors may increase the accuracy and/or likelihood of matching the extracted feature vectors (e.g., feature vectors 256) to the feature vectors in template 220 during the re-initiation of process 250.

In some embodiments, other selected criteria are adjusted in 310. For example, for the portion of the face of the user being in the field of view of the camera, the minimum portion of the face of the user needed in the field of view of the camera required may be increased. For the pose of the user's face, the allowable levels for the pitch, yaw, and/or roll of the face may be decreased (e.g., less pitch, yaw, and/or roll off a normal position are allowed). For attention of the user, the limit on attention may be increased (e.g., the tolerance for minimum attention may be increased). For exposure, the range of exposure allowed in the image may be decreased.

In some embodiments, the user is provided feedback when process 250 fails in 262 because the unlock attempt images are not matching template 220 and the re-initiation of process 250 is being implemented. The feedback may include providing an audio message, a visual message, or another notification to the user on device 100. In some embodiments, if the distance between the user's face and camera 102 estimated from the depth map images indicates that the user's face was near the lower limit of the selected distance range, feedback may be provided that the user's face may be too close to the camera and the user may move their face further away from the camera for increase chances of authentication. The user may also receive feedback if some occlusion is detected. Such feedback may include asking the user to make sure the face and/or camera are free from occlusions or obstructions. Additional feedback may be provided to the user if a partial face of the user is detected in the frame or scene of an image (e.g., when portions of forehead, chin, left side, or right side of face are cut off). The feedback may include asking the user to better position the user's face in the frame or scene for capturing an image. For example, the user may be asked to move his/her head towards a center of the frame.

Adjusting one or more selected criteria in 310 for re-initiations of process 250 may provide a more satisfying user experience for the user. The experience may be more satisfying as the re-initiated attempts (e.g., retry attempts) of process 250 to authenticate the user may have a higher chance of success (if the user attempting to unlock device 100 is the authorized user) with the tighter tolerances placed on the selected criteria. Providing higher chances of success for process 250 may decrease the frequency that the user has to use a secondary authentication process to unlock device 100. The user may also experience faster unlocking of device 100 with automated retry attempts of process 250. These factors may increase the satisfaction of the authorized user in the facial recognition authentication process, thus increasing the usability of the facial recognition authentication process for the user.

In certain embodiments, one or more process steps described herein may be performed by one or more processors (e.g., a computer processor) executing instructions stored on a non-transitory computer-readable medium. For example, process 200 and process 250, shown in FIGS. 4 and 7, may have one or more steps performed by one or more processors executing instructions stored as program instructions in a computer readable storage medium (e.g., a non-transitory computer readable storage medium).

Figure 8:
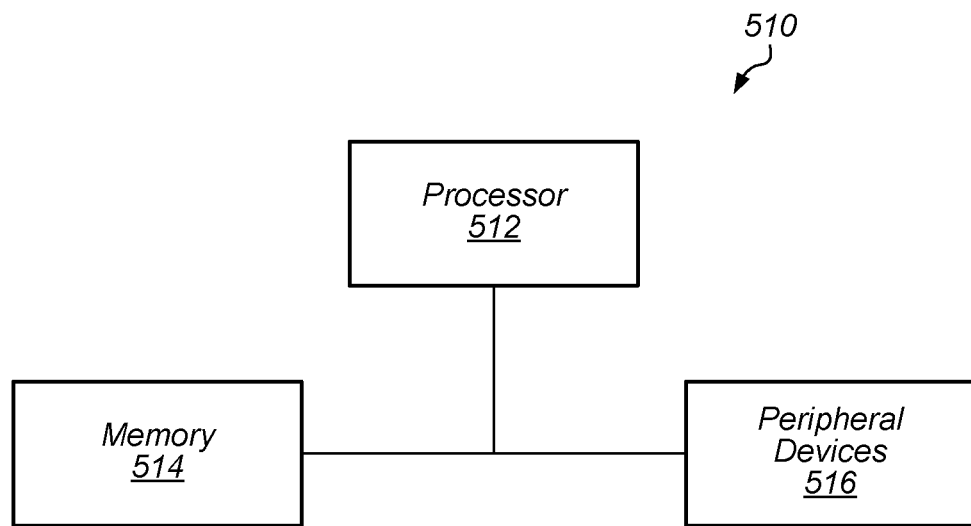
FIG. 8 depicts a block diagram of one embodiment of an exemplary computer system.

FIG. 8 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200 and process 250, shown in FIGS. 4 and 7. In the embodiment of FIG. 8, computer system 510 includes processor 512, memory 514, and various peripheral devices 516. Processor 512 is coupled to memory 514 and peripheral devices 516. Processor 512 is configured to execute instructions, including the instructions for process 200 and/or process 250, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 9:
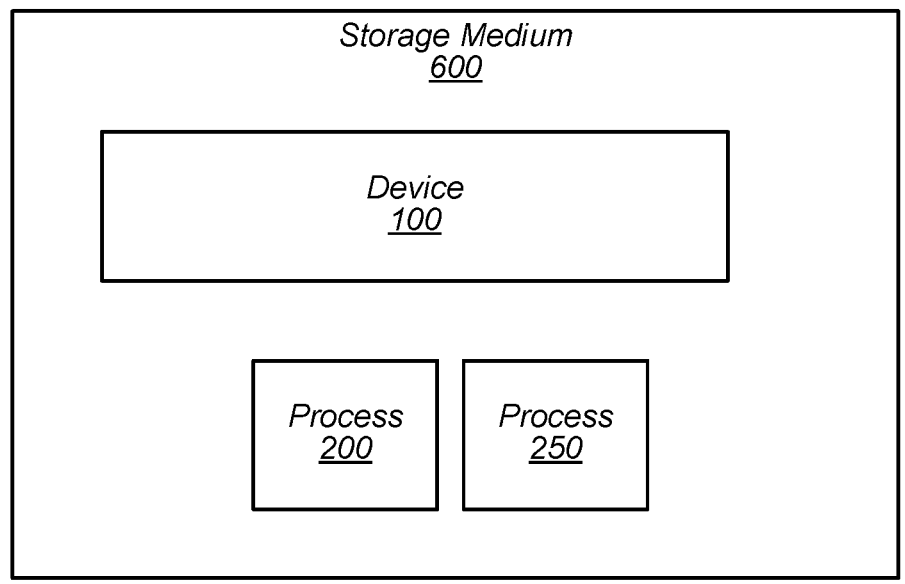
FIG. 9 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 9, other input/output (I/O) devices such as video hardware, audio hardware, user interface devices, networking hardware, etc.).

Turning now to FIG. 9, a block diagram of one embodiment of computer accessible storage medium 600 including one or more data structures representative of device 100 (depicted in FIG. 1) included in an integrated circuit design and one or more code sequences representative of process 200 and/or process 250 (shown in FIGS. 4 and 7). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

The invention claimed is:

1. A method, comprising:
receiving, on a device comprising a computer processor and a memory, a user authentication request for the device initiated by a user of the device;
in response to receiving the user authentication request, capturing a first gate image using a camera located on the device;
assessing the first gate image to determine whether the first gate image satisfies a set of gate criteria for gate images, wherein the gate criteria are criteria to be met in the gate images before additional images are captured for determining authentication of the user;
in response to the first gate image satisfying the set of gate criteria, capturing at least one first authentication attempt image using the camera located on the device;
determining whether to authenticate the user as an authorized user of the device by comparing a face of the user in the at least one first authentication attempt image to one or more reference templates for the authorized user, wherein determining whether to authenticate the user as the authorized user of the device by comparing the face of the user in the at least one first authentication attempt image to one or more reference templates for the authorized user includes comparing feature vectors in the at least one first authentication attempt image to feature vectors in the one or more reference templates;
in response to failing to authenticate the user as the authorized user of the device using the at least one first authentication attempt image, adjusting, by the computer processor, the set of gate criteria for gate images, wherein adjusting the set of gate criteria includes making a tolerance in at least one gate criterion to be met in subsequent captured gate images more restrictive;
capturing a second gate image using the camera located on the device;
assessing the second gate image to determine whether the second gate image satisfies the adjusted set of gate criteria for gate images, wherein said satisfying includes satisfying the more restrictive tolerance in the at least one gate criterion;
in response to the second gate image satisfying the adjusted set of gate criteria, capturing at least one second authentication attempt image of the user using the camera located on the device; and
determining whether to authenticate the user as the authorized user of the device by comparing the face of the user in the at least second authentication attempt image to the one or more reference templates for the authorized user.

2. The method of claim 1, further comprising authenticating the user on the device in response to determining that the user in the at least one second authentication attempt image is the authorized user.

3. The method of claim 1, wherein determining whether to authenticate the user in the at least one first authentication attempt image as the authorized user of the device comprises:
comparing the face of the user in the at least one first authentication attempt image to the one or more reference templates for the authorized user to generate a first matching score; and
determining the user is the authorized user of the device in response to the first matching score being above an unlock threshold.

4. The method of claim 3, wherein determining whether to authenticate the user in the at least one second authentication attempt image as the authorized user of the device comprises:
comparing the face of the user in the at least one second authentication attempt image to the one or more reference templates for the authorized user to generate a second matching score; and
determining the user is the authorized user of the device in response to the second matching score being above the unlock threshold.

5. The method of claim 1, wherein the set of gate criteria for properties in gate images comprises one or more of the following gate criteria: a minimum portion of the face of the user being in a field of view of the camera, a pose of the face being proper, a distance between the face of the user and the camera being in a selected distance range, the face of the user having occlusion below a minimum value, and eyes of the user not being closed.

6. The method of claim 1, wherein the first gate image is captured using a first type of illumination, and wherein the at least one first authentication attempt image comprises at least one image captured using the first type of illumination and at least one image captured using a second type of illumination.

7. The method of claim 6, wherein the first type of illumination comprises flood IR illumination, and wherein the second type of illumination comprises patterned IR illumination.

8. A device, comprising:
a camera;
at least one illuminator providing illumination; and
circuitry coupled to the camera and the illuminator, wherein the circuitry is programmed to:
receive a user authentication request for the device initiated by a user of the device;
capture, in response to receiving the user authentication request, a first gate image using the camera;

assess the first gate image to determine whether the first gate image satisfies a set of gate criteria for gate images, wherein the gate criteria are criteria to be met in the gate images before additional images are captured for determining authentication of the user;

capture, in response to the first gate image satisfying the set of gate criteria, at least one first authentication attempt image using the camera;

determine whether to authenticate the user as an authorized user of the device by comparing a face of the user in the at least one first authentication attempt image to one or more reference templates for the authorized user, wherein the circuitry is programmed to determine whether to authenticate the user as the authorized user of the device by comparing the face of the user in the at least one first authentication attempt image to one or more reference templates for the authorized user by comparing feature vectors in the at least one first authentication attempt image to feature vectors in the one or more reference templates;

authenticating the user on the device in response to determining that the user is the authorized user using the at least one first authentication attempt image;

adjust, by the circuitry, the set of gate criteria for gate images, wherein adjusting the set of gate criteria includes making a tolerance in at least one gate criterion to be met in subsequent captured gate images more restrictive in response to failing to authenticate the user as the authorized user of the device using the at least one first authentication attempt image;

capture a second gate image using the camera;

assess the second gate image to determine whether the second gate image satisfies the adjusted set of gate criteria for gate images, wherein said satisfying includes satisfying the more restrictive tolerance in the at least one gate criterion;

capture, in response to the second gate image satisfying the adjusted set of gate criteria, at least one second authentication attempt image of the user using the camera;

determine whether to authenticate the user as the authorized user by comparing the face of the user in the at least second authentication attempt image to the one or more reference templates for the authorized user; and authenticating the user on the device in response to determining that the user is the authorized user using the at least one second authentication attempt image.

9. The device of claim 8, wherein the circuitry is programmed to:
compare the face of the user in the at least one first authentication attempt image or the at least one second authentication attempt image to the one or more reference templates for the authorized user to generate a matching score; and
compare the matching score to an unlock threshold to determine whether the user is the authorized user of the device.

10. The device of claim 8, wherein the set of gate criteria for gate images comprises one or more of the following gate criteria: a minimum portion of the face of the user being in a field of view of the camera, a pose of the face being proper, a distance between the face of the user and the camera being in a selected distance range, the face of the user having occlusion below a minimum value, and eyes of the user not being closed.

11. The device of claim 8, wherein the at least one illuminator comprises a first illuminator providing a first type of illumination and a second illuminator providing a second type of illumination, and where the first gate image is captured using the first type of illumination, and wherein the at least one first authentication attempt image comprises at least one image captured using the first type of illumination and at least one image captured using the second type of illumination.

12. The device of claim 11, wherein the first type of illumination comprises flood IR illumination and the second type of illumination comprises patterned IR illumination.

13. The device of claim 8, wherein the user authentication request comprises a request to attempt to authorize the user on the device initiated by the user.

14. The device of claim 8, wherein the circuitry is programmed to automatically capture the second gate image and the at least one second authentication attempt image using the camera without input from the user.

15. The device of claim 8, further comprising a display on the device, wherein the circuitry is programmed to provide a notification to the user on the display in response to determining the user is not the authorized user.

16. A non-transient computer-readable medium including instructions that, when executed by one or more processors, causes the one or more processors to perform a method, comprising:
receiving, on a device comprising a computer processor and a memory, a user authentication request for the device initiated by a user of the device;
in response to receiving the user authentication request, capturing a first gate image using a camera located on the device;
assessing the first gate image to determine whether the first gate image satisfies a set of gate criteria for gate images, wherein the gate criteria include criteria to be met in the gate images before additional images are captured for determining authentication of the user;
in response to the first gate image satisfying the set of gate criteria, capturing at least one first authentication attempt image using the camera located on the device;
determining whether to authenticate the user as an authorized user of the device by comparing a face of the user in the at least one first authentication attempt image to one or more reference templates for the authorized user, wherein determining whether to authenticate the user as the authorized user of the device by comparing the face of the user in the at least one first authentication attempt image to one or more reference templates for the authorized user includes comparing feature vectors in the at least one first authentication attempt image to feature vectors in the one or more reference templates;
in response to failing to authenticate the user as the authorized user of the device using the at least one first authentication attempt image, adjusting, by the computer processor, the set of gate criteria for gate images, wherein adjusting the set of gate criteria includes making a tolerance in at least one gate criterion to be met in subsequent captured gate images more restrictive;
capturing a second gate image using the camera located on the device;
assessing the second gate image to determine whether the second gate image satisfies the adjusted set of gate criteria for gate images, wherein said satisfying includes satisfying the more restrictive tolerance in the at least one gate criterion;

in response to the second gate image satisfying the adjusted set of gate criteria, capturing at least one second authentication attempt image of the user using the camera located on the device; and determining whether to authenticate the user as the authorized user of the device by comparing the face of the user in the at least second authentication attempt image to the one or more reference templates for the authorized user.

17. The non-transient computer-readable medium of claim 16, wherein the first gate image is captured using a first type of illumination, and wherein the at least one first authentication attempt image comprises at least one image captured using the first type of illumination and at least one image captured using a second type of illumination.

\* \* \* \* \*